United States Patent Office 3,457,977
Patented July 29, 1969

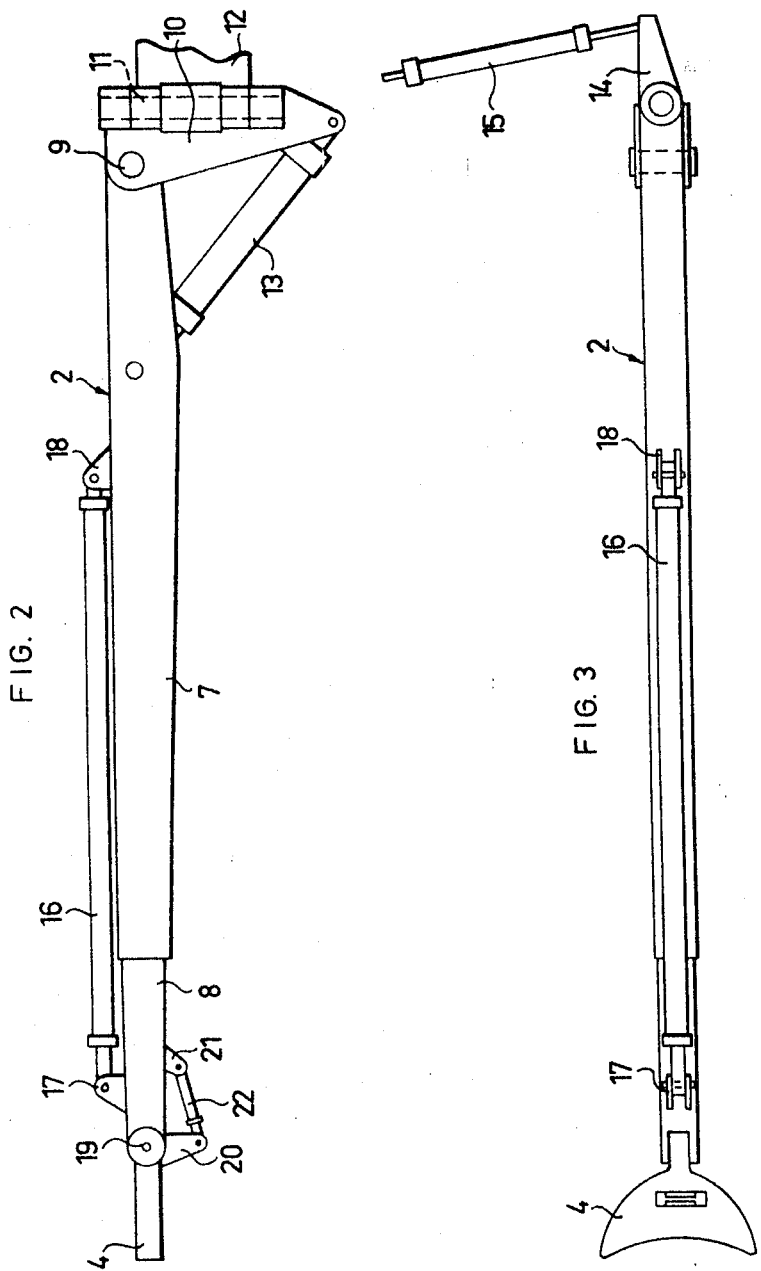

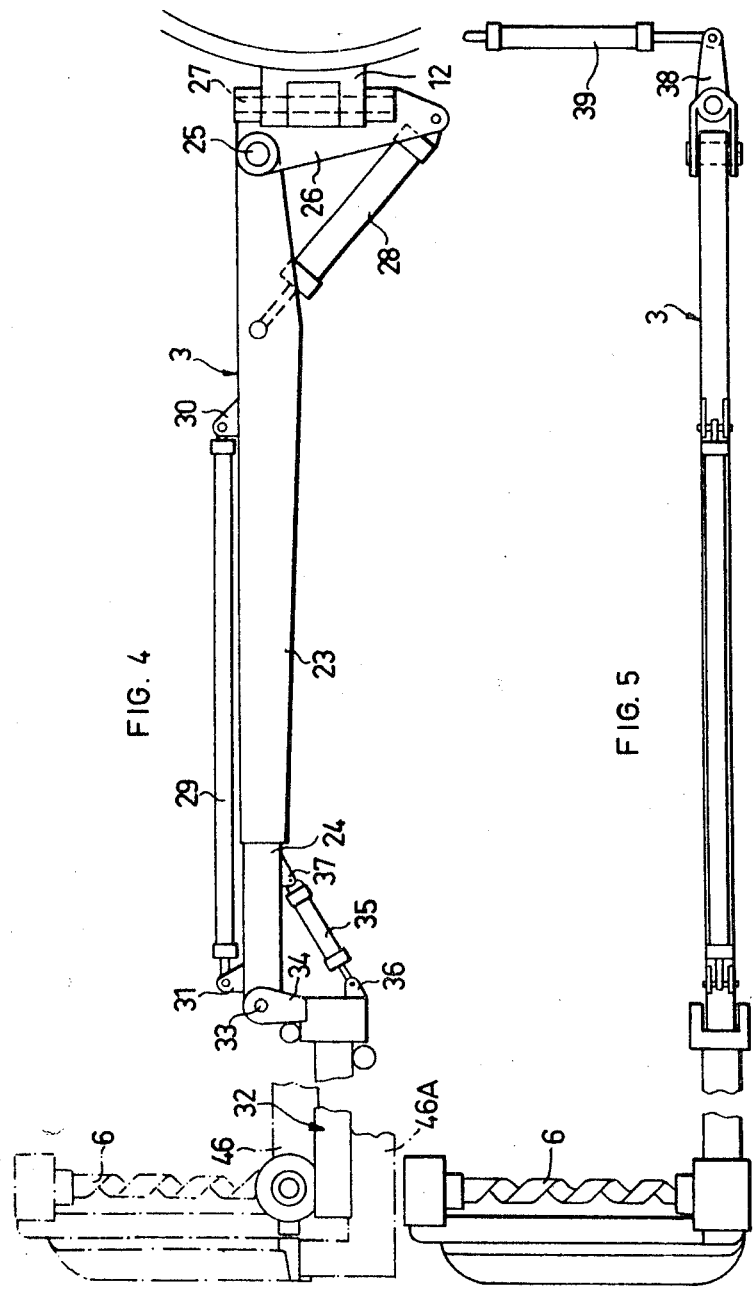

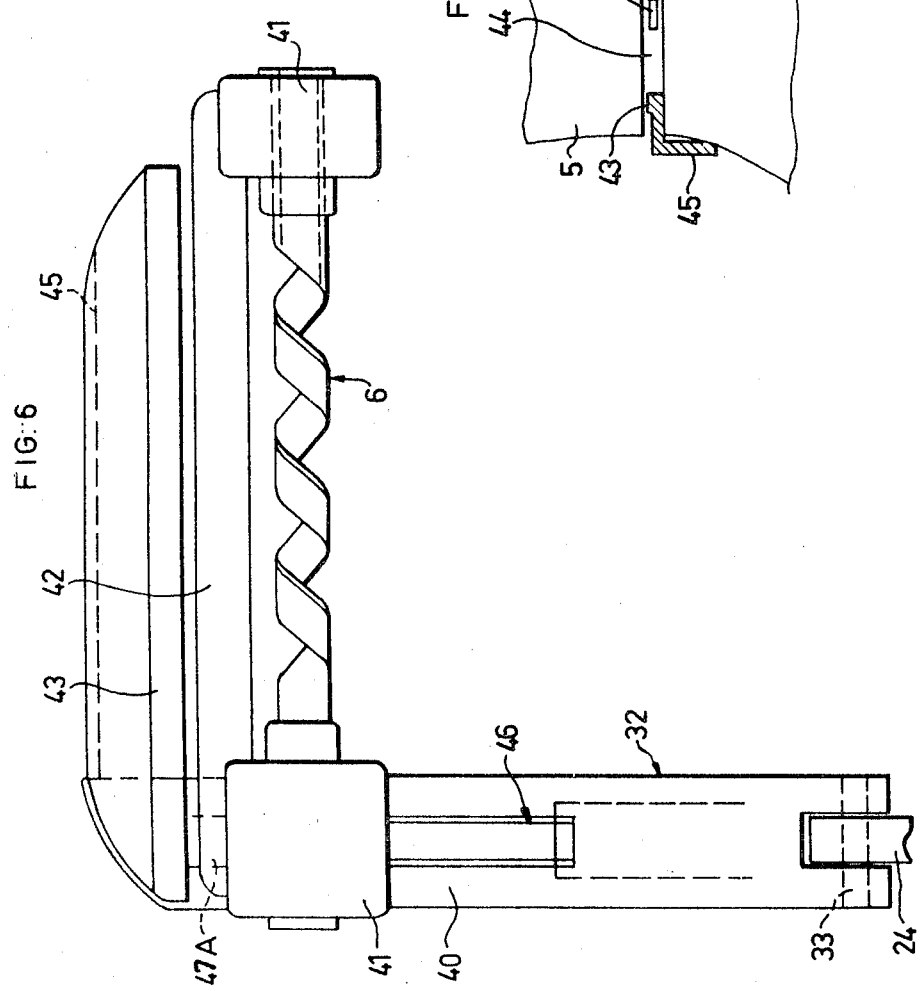

3,457,977
APPARATUS FOR HARVESTING STANDING TIMBER OR DIVIDING TREES INTO SECTIONS
Carl-Erik Andersson and Rune Krook, Malmo, Sweden, assignors to Kockums Mekaniska Verkstads, Aktiebolag Stora Varvsgatan, Malmo, Sweden
Filed Feb. 8, 1967, Ser. No. 614,692
Claims priority, application Sweden, Feb. 15, 1966, 1,911/66
Int. Cl. A01g 23/08; B27b 1/00
U.S. Cl. 144—309                    11 Claims

ABSTRACT OF THE DISCLOSURE

An apparatus for harvesting or dividing trees by means of a power-driven tool making a cut in the tree, comprising supporting means which in the initial stage of the tool cutting operation penetrates into the cut to prevent jamming of the tool between the surface of the cut, said supporting means having an abutment member for fixation of the depth of penetration of the supporting means into the cut made by the tool in the tree. Said abutment member is constituted by a projection on the edge of the supporting means facing away from the tool, which projection serves for the fixation of the supporting means in the cut by being brought into application with the outer side of the tree.

---

Rationalized timber harvesting aims at reducing the various harvesting phases to a minimum of rapid operations realized by mechanical means, to save time and labour. To this end, it shall be possible to fell a tree by means of a single continuous cut without any preliminary operations. In the most advanced procedure the tree is simply cut off and severed from the root by means of a wedging blade moving against an anvil, whereupon the tree is divided in the same way into measured log sections. This harvesting arrangement, however, will result in the formation of cracks in the felled trees and log sections, respectively, said cracks reaching from the surface of the cut almost half a meter into the logs, thus deteriorating them considerably. Use has also been made of tools having a helically coiled edge and operating in the manner of a milling cutter. Such tools operate but slowly, presumably because the millings are not carried away sufficiently rapidly.

These and other deficiencies of the prior-art apparatus are eliminated by the apparatus according to the present invention.

The invention will be described more in detail in the following with reference to the accompanying drawings in which:

FIGURE 2 is a side elevational view of a detail of the tree harvesting machine shown in FIGURE 1;

FIGURE 3 is a plan view of the detail shown in FIGURE 2;

FIGURE 4 is a side elevational view of the harvesting apparatus and the mechanisms in the tree harvesting machine, which are adapted to operate said apparatus representing certain portions of the apparatus when rotated 90° from their solid line positions shown in this figure.

FIGURE 5 is a plan view of the harvesting apparatus and the operating means thereof;

FIGURE 6 is a view on a larger scale of the harvesting apparatus;

FIGURE 7 is a view of the harvesting apparatus in operation.

Figure 1:
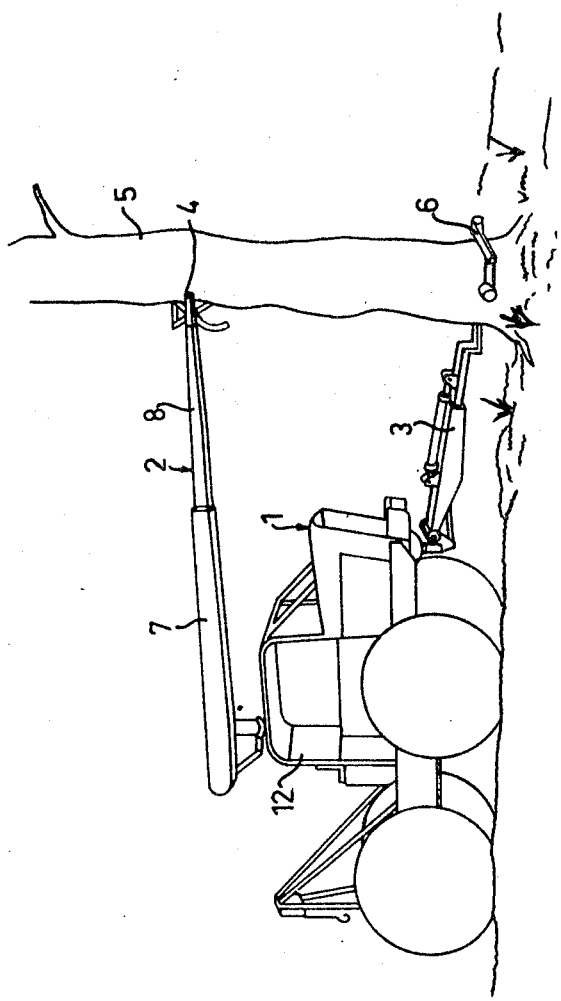
FIGURE 1 is a perspective view of a tree harvesting machine in operation, which is equipped with a suitable embodiment of the harvesting apparatus.

The tree harvesting machine illustrated in FIGURE 1 comprises a four-wheeled tractor 1 having a two-piece chassis, a guiding arm 2 and a felling arm 3. At its free end the guiding arm 2 has a member 4 for engaging a tree 5. At the free end of the felling arm 3 a harvesting tool 6 is arranged and adapted for engagement with the tree 5 at ground level as distinct from the tree engaging member 4 which is caused to engage the tree at a point spaced a considerable distance from the point at which the harvesting tool 6 is engaged with the tree. The arms 2 and 3 are connected to the power source of the tree harvesting machine 1 to permit moving the arms and driving the operating means of said arms.

The guiding arm 2 comprises at least two relatively movable sections 7 and 8. Section 7 is mounted by means of a horizontal pivot shaft 9 in a fastening 10 which is mounted in the superstructure 12 of the tree harvesting machine 1 with the aid of a vertical pivot shaft 11. A hydraulic cylinder and piston assembly 13 is inserted between section 7 of the guiding arm 2 and the fastening 10 to permit vertical pivotment of the guiding arm 2. For the horizontal pivotment of the guiding arm 2 said arm has an operating arm 14 (FIGURE 3) projecting from the region of the pivot shaft 11, a cylinder and piston assembly 15 being interposed between said operating arm 14 and the superstructure 12 of the harvesting machine. A cylinder and piston assembly 16 is inserted between sections 7 and 8 of the guiding arm 2 to bring about relative axial shifting of said sections, said assembly 16 being connected to fastenings 17, 18 on the guiding arm sections 8 and 7, respectively. At the free end of section 8 the tree engaging member 4 is pivotally mounted on a pivot shaft 19 and is equipped with a downwardly extending arm 20, a cylinder and piston assembly 22 being interposed between said arm 20 and a fastening 21 at the underside of section 8. The cylinder and piston assemblies are connected to a hydraulic power source (not shown) in the harvesting machine 1.

The felling arm 3 also comprises at least two sections 23 and 24. Section 23 is mounted for vertical swinging movement by means of a pivot shaft 25 in a fastening 26 which in turn is mounted for horizontal swinging movement in the superstructure 12 of the tree harvesting machine by means of a vertical pivot shaft 27. A hydraulic cylinder and piston assembly 28 is connected between section 23 and fastening 26. Sections 23 and 24 of the felling arm 3 are interconnected by means of a cylinder and piston assembly 29 which is connected to section 23 and 24, respectively, by fastenings 30 and 31. At the free end of section 24 the mounting and drive means 32 of the tool 6 is vertically pivotally mounted by means of a pivot shaft 33. For this purpose, the means 32 has a fork-shaped bearing 34, and a cylinder and piston assembly 35 is interconnected between the lower portion of said bearing 34 and section 24 by means of fastenings 36, 37 in the means 32 and the felling arm section 24. From the fastening 26 in the region of the pivot shaft 27 there projects an operating arm 38, a cylinder and piston assembly 39 being interposed between said operating arm 38 and the superstructure 12 of the machine 1 for enabling the felling arm 3 to swing horizontally. The cylinder and piston assemblies 39, 28, 29 and 35 are connected to the hydraulic power source of the harvesting machine 1.

The means 32 for mounting and driving the tool 6 comprises a frame 40 and bearings 41 for the tool 6 and a transmission (not shown) for making the tool operative. Extending between the bearings 41 is a member 42 which interconnects said bearings and is narrower than the tool 6 for a purpose that will appear from the following. The frame 40 further has a supporting means 43 which in the embodiment illustrated is movable relative to the frame 40, the tool 6 and the bearings 41 thereof and which is disposed on the side of the tool 6 opposite to the tree engaging side and in alignment with the tool, said supporting means having such dimensions that like the connecting member 42 it can be inserted in a cut 44 made by the tool 6 in the tree 5 for the felling thereof, all for a purpose that will appear from the following. The connecting member 42 thus lies between the tool 6 and the supporting means 43. Further, both the connecting member 42 and the supporting means 43 are in the form of bars extending in parallel with the tool 6 and at right angles to the felling arm 3. The supporting means 43 which suitably is movable relative to the frame 40, also has an abutment member 45 which in the embodiment shown by way of example is a projection at the underside of the supporting means and at the edge of the supporting means facing away from the tool 6. As will appear particularly from FIGURE 6, the supporting means 43 in cross section substantially has the shape of an angle iron. One limb of the angle iron, which is intended to serve as a support and has a thickened portion, can be inserted in the cut 44, and the other limb of said angle iron, which constitutes the abutment member 45 is adapted to be engaged with the outer side of the tree for a purpose that will appear from the following. The abutment member 45 is adapted to fix the supporting means 43 in a position (FIGURE 7) in which the latter is partly inserted in the cut 44 provided by means of the tool 6. Inserted respectively between the bearings 41 of the tool 6 and the frame 40, and between the supporting means 43 and the frame 40 is a hydraulic mechanism 46 and 47a, respectively, which is connected to the power source of the harvesting apparatus in a manner not shown, and said hydraulic devices 46, 47a serve to move the tool 6 relative to the frame 40 and the supporting means 43, and said last mentioned supporting means relative to the tool 6.

For felling a tree the tool 6 is first engaged with the tree 5 in the manner illustrated in FIGURE 1, whereupon the tool is caused to rotate for making the cut 44. After the tool rotation for making the cut 44 has started and is running smoothly the supporting means 43, in the initial stage of making said cut, is inserted in the cut 44 between the surfaces thereof at or near the periphery of the tree in that the operating member 47a pulls the supporting means 43 into the cut 44. The support point formed by said supporting means 43 is fixed in relation to the tree 5, the log section to be divided being supported as the cut is completed, and when falling to the ground the log section is caused to pivot about the supporting means which constitutes a hinge for the divided log section. The fall of the tree and the guiding thereof in the desired direction of fall is brought about by relatively moving the guiding arm sections 7 and 8 and by the resulting lengthening of said arm. The supporting means 43 can be introduced into the cut 44 only to the extent determined by the abutment member 45 which is applied against the outer side of the tree when the arm 3 is shortened for engagement of the tool 6 with the tree and shortly afterwards the supporting means 43 is inserted in the cut 44. As a result of the abutment member 45 bearing against the tree on the side thereof opposite to the point of application of the guiding arm 2 against the tree, the tree harvesting machine 1 will take a very stable position during the entire harvesting operation when the tree is severed from the root and is caused to fall to the ground. Work can therefore be carried out rapidly without any change of position of the machine.

The supporting means 43 can either be movable in relation to the frame 40 in the manner described, which will make the entire apparatus readily maneuverable, or said means can be stationary relative to said frame 40.

In an alternative embodiment the supporting means 43 can be releasable by means of a releasable blocking device. When the tool 6 starts making the cut and the connecting member 42 is introduced between the surfaces of the cut the supporting means 43 is taken along in the movement until the abutment member 45 prevents a further movement of the supporting means, the blocking device being then released.

Further modifications are conceivable within the scope of the invention defined in the appended claims.

What we claim and desire to secure by Letters Patent is:

1. For use in cutting and felling standing timber or trees, a tool assembly comprising in combination, a frame, a cutting tool mounted on the frame for movement with the frame transversely of a tree to be cut, a support member dimensioned to be received in a cut in a tree to prevent jamming of the cutting tool between the surfaces of the cut, means mounting the support member on the frame to permit movement of the frame relative to the support member during a cutting operation performed by said cutting tool, said support member having an abutment means rigidly fixed thereto such that upon movement of the frame through a cut during a cutting operation the abutment means will engage a portion of the tree being cut to fix the depth of penetration of the supporting member in the cut while causing the frame to move relative to the support member for the duration of the cutting operation.

2. The assembly defined in claim 1 wherein said support member has one side facing said tool and a second side opposite said one side, and wherein said abutment means projects at an angle from said second side to be engageable with the outside surface of the tree being cut so that the support member may also be employed as a fulcrum for pivoting the tree during felling thereof.

3. The assembly defined in claim 2 wherein said support member has an angular cross section including one limb which is receivable in the cut in the tree and a second limb projecting at an angle from said first limb and constituting said abutment means.

4. The assembly defined in claim 3 further including power operated drive means mounted on the frame for moving said support member relative to the frame and into the cut in the tree.

5. The assembly defined in claim 4 further including a second power operated drive means mounted on the frame for moving the cutting tool relative to the frame during a cutting operation.

6. Apparatus for cutting and felling standing trees or similar operations, the apparatus comprising in combination, a frame having one end portion adapted to be pulled through a transverse cut in a tree to be felled and an opposite end portion adapted to be supported at a point away from the tree, a cutting tool means mounted on the frame at a location spaced from said one end portion of the frame for movement with the frame to produce a transverse cut in the tree as the frame is being pulled, a support member mounted on the frame at said one end portion thereof to follow said cutting tool means into the tree during the cutting operation as the frame is pulled through the cut in the tree, said support member being dimensioned to be received in the cut to prevent jamming of the tool between the surfaces of the cut, and means for pushing the tree forwardly at a location spaced above said frame and in a direction opposite to the direction in which the frame moved during cutting of the tree to cause the portion of the tree above the cut to pivot about said support member when the cut made by said cutting tool means reaches a sufficient depth.

7. The apparatus defined in claim 6 further including means mounting said support member to said frame to permit said frame to move relative to said support member during a cutting operation, and wherein said support member has abutment means engageable with a portion of the tree being cut to fix the depth of said support member in the cut while allowing said frame to move relative to the support member to complete the cut after the position of said support member becomes fixed in the cut by said abutment means.

8. The apparatus defined in claim 7 wherein said abutment means is rigidly fixed to said support member and projects therefrom at an angle to be engageable with an outside portion of the tree being cut.

9. A method of cutting and felling a standing tree or timber comprising the steps of pulling a cutting tool generally transversely through a tree in one direction to form a cut in the tree, inserting a support member into the cut behind the cutting tool means to prevent jamming of the cutting tool between the surfaces of the cut as well as for forming a fulcrum for the upper portion of the tree during felling, and then pushing the upper portion of the tree in a direction opposite to said one direction to fell the upper portion of the tree by pivoting about said support member.

10. The method defined in claim 9 wherein said support member is introduced into the cut in the tree simultaneously as the cutting operation by the cutting tool proceeds through the tree.

11. The method defined in claim 10 further including the step of limiting the depth of penetration of the support member into the cut of the tree such that the support member is positioned adjacent the outer end of the cut on the side of the tree towards which the tree is pushed.

References Cited
FOREIGN PATENTS 46,482  2/1920  Sweden.

FRANCIS S. HUSAR, Primary Examiner

U.S. Cl. X.R.

144—34